United States Patent Office 2,951,087
Patented Aug. 30, 1960

2,951,087

CLAY COMPLEXES WITH CONJUGATED UNSATURATED ALIPHATIC COMPOUNDS OF FOUR TO FIVE CARBON ATOMS

Ernst A. Hauser, deceased, late of Cambridge, Mass., by The Merchants National Bank of Boston, Boston, Mass., executor, and Robert C. Kollman, Rockville Centre, N.Y., assignors to National Lead Company, New York, N.Y., a corporation of New Jersey No Drawing. Filed Mar. 28, 1958, Ser. No. 724,520

6 Claims. (Cl. 260—448)

This invention relates to novel clay-hydrocarbon complexes and to methods of preparing the same. More specifically, this invention relates to complexes formed by a reaction between a clay and an unsaturated hydrocarbon.

It has previously been suggested to treat clays, particularly base-exchanging clays, with various types of amine complexing agents to replace the metal cation of the clay in whole or in part with an organic amine cation, thus converting the clay from a hydrophilic to an organophilic material, making it possible to disperse the modified clay in organic media, such as oils, greases, coating compositions, elastomers, adhesives, putties, caulking compounds, wood fillers, paint and varnish removers, printing inks, hydraulic fluids, and the like. The modified clays have found considerable application as compounding ingredients, bulking agents and the like in such systems.

It has also been suggested to replace the cation of the clay with other non-metallic cations, such as hydrogen, ammonium, and the like, for a variety of uses.

It has now been discovered that clays in general, both of the base-exchanging and non-base-exchanging types, have the unexpected property of reacting in conjunction with low-molecular-weight cyclic and acyclic conjugated diolefins, to form organophilic clay-hydrocarbon complexes which are useful in various ways as described above and also, for example, as reinforcing agents in the compounding of elastomers, such as the various natural and synthetic rubbers and the like, and for a wide variety of other uses.

Broadly, therefore, this invention contemplates a clay-hydrocarbon complex which is the reaction product of a clay with an unsaturated organic compound selected from the group consisting of low-molecular-weight conjugated unsubstituted hydrocarbons and low-molecular-weight conjugated halogen-substituted hydrocarbons.

This invention particularly contemplates a clay complex which comprises the reaction product of a clay with a conjugated diolefin having up to five carbon atoms.

The clays which are useful as starting materials in accordance with this invention include both those exhibiting base-exchange properties and those having little or no base-exchange capacity. The term "clay," as used in the specification and the claims, therefore includes, for example, montmorillonites, such as the sodium and magnesium bentonites, hectorite, nontronite, attapulgite, illite, zeolites, fuller's earths (particularly those of the Georgia-Florida type), vermiculite, halloysite, kaolinite, nacrite and dickite.

Although most of the clays above are capable of producing the complexes of this invention in their natural state, it is sometimes desirable to activate the clay by a preliminary acid treatment. This may be accomplished by dispersing the clay in a weak acid, e.g. 0.1 N HCl followed by washing to remove excess HCl, or by treatment with an ion-exchange resin in the acid form. When the clay so treated is of a base-exchanging type, this treatment results in the conversion of the clay to its hydrogen-modified form by substitution of hydrogen for the metallic cation of the clay. This is apparently only incidental, however, as the acid-activation is also effective in the case of clays having little or no base-exchange capacity.

While substantially any clay may be employed, particularly good results have been obtained with hydrogen-modified bentonites produced as above.

It is apparently necessary that the clay be dry in order to react properly with the conjugated diolefin. To this end, a moderate oven-drying, for example one-half hour at 105° C. is sufficient, under conditions allowing free circulation of air and unimpeded escape of moisture.

While any conjugated hydrocarbon or halogen-substituted hydrocarbon may be employed, the most pronounced effects to date have been obtained with conjugated acyclic diolefins having up to five carbon atoms, and these compounds are therefore preferred as the hydrocarbons to be employed.

By the term "low-molecular-weight," as used to describe the unsaturated organic compound, we mean to suggest that the molecular weight should not be appreciably higher than, say, 200.

The exact nature of the reactions which take place, and the precise structure of the products formed in accordance with the present invention are not as yet established, and applicant therefore does not wish to be limited to any particular reaction mechanism or any particular structure. However, it would appear that the hydrocarbon undergoes a polymerization, catalyzed by the clay, and that the resulting polymer is formed on the surface of each individual clay particle, resulting in a powdery material comprising composite particles each having a clay core and a surface of polymer. The combination of the polymer with the clay may be physical in nature, or chemical, or a combination of the two. It is, however, an intimate and closely-bound combination of some sort, and is most probably chemical in nature, as evidenced by the fact that, while a certain proportion of unreacted or partially-polymerized conjugated diolefin can be extracted from the crude reaction mixture with organic solvents such as benzene, there remains a considerable fraction of organic carbon that cannot be removed by repeated extractions with benzene. This organic carbon may correspond to as much as 70% or more, based on the weight of the complex. The composition of the complex product is frequently as high as 80% or more organic, and the bulk volume sometimes greatly in excess of that of the original clay.

In order to illustrate more clearly the manner of carrying out the present invention and the nature of the products thereof, the following examples are presented:

Example 1

In this example, a Wyoming bentonite was freed of grit, transformed into hydrogen bentonite by dilute HCl treatment, and the washed, dried, and ground acid clay was reacted with isoprene.

To make hydrogen bentonite, 180 grams of a Wyoming sodium bentonite, which in dry form has a particle size of 99% finer than 20 microns, was dispersed in 6000 ml. of water. This dispersion was centrifuged at 25,000 r.p.m. in a super centrifuge and the grit-free portion of the paste in the centrifuge bowl was redispersed in the effluent. Fifty-seven grams of concentrated HCl was added to the clay dispersion along with sufficient additional water to bring the volume back to 6000 ml. and thus make an approximately 0.1 N HCl solution. After agitating for a short period, the acid slurry was centrifuged. The recovered treated clay was redispersed in 6000 ml. of fresh 0.1 N HCl solution for a second leaching operation and, after centrifuging, once again for a total of three dilute acid treatments. After the third HCl leach, the clay was washed twice with approximately 3000 ml. portions of distilled water to remove excess HCl by the same steps of dispersion and centrifugation. The product was then dried on a steam bath, ground on a ball mill, and sieved. The product of these operations was a hydrogen bentonite in which the original inorganic replaceable cations of the clay had been replaced by hydrogen to the extent of approximately 80–90 milliequivalents per 100 grams of clay.

A sample of the oven-dried hydrogen bentonite weighing 17.6 grams and having a particle size of less than 325 mesh was placed in a container and 80 ml. (about 55 grams) of freshly distilled isoprene was added. The closed container was allowed to stand at room temperature after the contents had been thoroughly mixed. The following changes were observed with the passage of time, the mixture being swirled two or three times a day.

| Time | Color of Solids | Approx. Settled Volume of Solids Expressed as Percent of Combined Volume of Liquid and Solids |
| --- | --- | --- |
| Before mixing | light cream | |
| Right after mixing | light tan | |
| 3 hours after mixing | tan | 25 |
| 23 hrs. after mixing | gray-tan | 25 |
| 47 hrs. after mixing | | 25 |
| 48½ hrs. after mixing | | 33 |
| 56 hrs. after mixing | | 50 |
| 71 hrs. after mixing | orange brown | [1] over 100 |

[1] All supernatant liquid adsorbed by swollen clay.

The swollen solids were extracted four times with about 300 ml. portions of benzene, shaking vigorously with each portion of solvent and pouring off the liquid extract after batch centrifuging to settle the solids. The recovered dry product was a free-flowing, flesh-colored powder weighing 45.3 grams. The clay-hydrocarbon complex was analyzed for carbon and found to contain 43.4% C, corresponding to 49.2% "insoluble isoprene."

*Example 2*

In this example, a Wyoming sodium bentonite was freed of grit, transformed into hydrogen bentonite by treatment with the acid form of an exchange resin, and the washed, dried, and ground acid clay was reacted with isoprene.

Grit-free bentonite was prepared by gravity-settling a dispersion of 180 grams of sodium bentonite in 12 liters of water. After the initial dispersion was prepared, the grit was allowed to settle overnight and the resulting fine suspension was removed by siphoning without disturbing the settled "mud." This settling step was repeated once more to give a substantially grit-free clay dispersion of about 1% solids content.

The hydrogen bentonite dispersion was then passed downward through a 3 inch diameter by 5¼ inch high bed of an exchange resin in the acid form at a rate of about 3 liters per hour. The effluent slurry was centrifuged to remove water and the resulting concentrated solids were dried on a steam bath, ground on a ball mill, and sieved.

A 40 gram sample of the oven-dried hydrogen bentonite having a particle size of less than 200 mesh was placed in a container with 320 ml. of freshly distilled isoprene. The closed container was allowed to stand at 90° F. after shaking to mix thoroughly. The following was observed.

| Time | Percent Increase in Volume of Settled Solids |
| --- | --- |
| 16½ hrs | 25 |
| 24½ hrs | 55 |
| 40½ hrs | 130 |
| 48½ hrs | 155 |
| 112½ hrs | 200 |

Using a Soxhlet extraction apparatus, the crude complex was extracted with benzene until all benzene soluble material had been removed. After removing solvent from the solids there was obtained 140 grams of the fine powdered organo-clay complex. The complex was found to contain 72.9% organic content on ignition.

*Example 3*

In this example, an oven-dried grit-free sodium bentonite was reacted with isoprene.

Grit-free sodium bentonite was prepared by centrifugation as in Example 1. The grit-free portion of the paste in the centrifuge bowl and the effluent were dried on a steam bath, mixed, ball milled, and sieved.

A 10 gram sample of oven-dried minus 200 mesh grit-free sodium bentonite was mixed with 20 ml. of freshly-distilled isoprene and the mixture was allowed to stand at 90° F. for 72 hours. In this period, the clay became a very light tan and increased in volume about 5%. On extracting with benzene in the accustomed manner, 11.62 gms. of organo-clay complex was obtained which contained 13.3% organic content.

*Example 4*

In this example, oven-dried hydrogen bentonite was reacted with chloroprene.

A 2.5 gram sample of minus 200 mesh hydrogen bentonite, prepared as in Example 2, was dried in an oven at 105° C. and mixed with 20 ml. of freshly-distilled chloroprene. There was an immediate change in color of the solids from clay to dark tan. The mixture was capped and after standing at 90° F. for 208 hours the solids had swollen to 115% of their original volume. Benzene extraction of the reactants yielded 4.93 gm. of chloroprene-clay complex which was found to have a 43.9% organic content.

*Example 5*

In this example, crude sodium bentonite was reacted with cyclopentadiene.

Volclay 625 is a Wyoming sodium bentonite which in dry form has a particle size of 99% finer than 20 microns, containing about 10% quartz as grit and a base exchange capacity of about 90 milliequivalent per 100 grams. A 2.5 gram sample was oven-dried at 105° C. and mixed with 20 ml. of freshly-distilled cyclopentadiene. After standing for 329 hours at 90° F. in a capped container, the clay had changed to a brown color and had increased 25% in volume. Benzene extraction of the reactants yielded 3.93 grams of a cyclopentadiene-clay complex which was found to have a 38.2% organic content.

*Example 6*

In this example, a hydrogen bentonite was reacted with butadiene at room temperatures.

A 5 gram sample of minus 325 mesh hydrogen bentonite, prepared by dilute hydrochloric acid leaching as in Example 1, was dried at 105° C., and placed in a pressure bottle which was then cooled in Dry Ice. Gaseous butadiene was introduced which condensed to a liquid on the cold bottle wall. When 25 to 30 ml. of butadiene had collected, the bottle was sealed and allowed to return to room temperatures. The pressure (about 40 p.s.i.) which developed in the sealed bottle kept the monomer in the liquid state. In 70 hours, swelling of the clay was observable and during the 30 day total time allowed to reaction, a further gradual increase in clay volume took place, the final volume being more than twice the initial volume. The recovered benzene extracted organo-clay complex was found on ignition to have an organic content of over 60%.

*Example 7*

In this example, kaolinite, a clay of low base exchange capacity and normally non-swelling, was reacted with isoprene after acid-activation.

Five grams of the acid-activated kaolinite having a particle size, in the dry state, of less than 200 mesh, was oven-dried at 105° C. and mixed with 40 ml. of freshly-distilled isoprene, and allowed to stand in a closed container. After standing 138 hours, the solids portion of the mixture had swelled to 155% of its original volume. After standing an additional 96 hours, the solids portion was removed and extracted with benzene. The extracted residue was analyzed and found to contain 71.1% organic matter.

*Example 8*

The procedure of Example 7 was repeated, except that the kaolinite was replaced by an equal quantity of vermiculite. There was in this case no apparent increase in the volume of the solids upon standing in contact with isoprene for 234 hours. Nevertheless, the extracted residue had a benzene-insoluble organic content of 10.0%.

*Example 9*

The procedure of Example 7 was again repeated, substituting for the kaolinite an equal quantity of attapulgite. Again, there was no increase in apparent volume of the solids, but the extracted residue in this case was 25.3% organic.

*Example 10*

The procedure of Example 7 was again repeated, substituting for the vermiculite an equal quantity of illite. A gradual increase in the apparent volume of the solids was noticeable within a few hours, and continued until, after standing 234 hours, the apparent volume was 360% of the original volume. At this point, the solids were removed and extracted with benzene. The extracted residue was 45.6% organic.

The products of this invention are organophilic modified clay complexes, useful as reinforcing agents in rubber and synthetic elastomers, bulking or thickening agents for organic liquid and suspensoid systems, as additives for asphalt compositions, particularly for use in roads, sidewalks, airstrips, service station aprons and the like, and also for roofing paints, water-proofing compounds, sealing compounds, roofing papers, paper-laminating compositions, undercoatings for automobiles and trucks, bonding materials for irrigation ditches, asphalt sidings, shingles, floor tile, joint-fillers for concrete roads, and erosion barriers. They are also useful as additives to oil-base drilling muds, well-bore packing fluids, additives to caulking compounds, and in a variety of ways which their unique combination of chemical and physical properties will readily suggest to those skilled in the art. They are particularly useful as bulking fillers for plastics and the like, by reason of their low density, which, for some of the complexes, is appreciably less than even that of carbon black, for example.

While this invention has been described with reference to certain specific embodiments and by way of certain examples, no undue limitations are to be deduced therefrom, and the invention is not to be limited except as set forth in the appended claims.

We claim:

1. A clay-organic complex, said complex being the reaction product of a clay selected from the group consisting of naturally occurring clays and acid-modified clays with an unsaturated organic compound selected from the group consisting of low-molecular-weight conjugated unsubstituted aliphatic hydrocarbons and low-molecular-weight conjugated halogen-substituted aliphatic hydrocarbons, said unsaturated organic compound containing from four to five carbon atoms.

2. A clay-organic complex according to claim 1, in which the inorganic cation of said clay has been at least partially replaced by hydrogen.

3. A complex according to claim 1, in which said unsaturated organic compound is isoprene.

4. A complex according to claim 1, in which said unsaturated organic compound is butadiene.

5. A complex according to claim 1, in which said unsaturated organic compound is cyclopentadiene.

6. A complex according to claim 1, in which said unsaturated organic compound is chloroprene.

References Cited in the file of this patent

Jordan: Journal of Physical and Colloid Chemistry, vol. 53, pp. 294 to 305 (1949).